United States Patent
Rutili et al.

[11] 3,981,470
[45] Sept. 21, 1976

[54] MOLDED PLASTIC ADJUSTABLE INSTRUMENT PANEL

[76] Inventors: Renzo N. Rutili, 1515 Madison St., Evanston, Ill. 60202; Howard J. Rasmussen, 1634 Meade Ave., Chicago, Ill. 60639

[22] Filed: Mar. 13, 1975

[21] Appl. No.: 557,939

[52] U.S. Cl. ................................ 248/291; 16/141; 16/DIG. 13; 248/314
[51] Int. Cl.² ...................... A47H 1/10; A47F 5/00
[58] Field of Search ..................... 16/139–146, 16/150, 128 R, DIG. 13; 220/324, 326, 339; 248/291, 309, 314, 315, 323, 324, 27; 24/258, 81 HS, 249 LL, 249 SL, 249 PP, 248 B, 248 SL, 250 R, 73 AP, 73 SH, 255 SL, 255 R, 132 HA

[56] References Cited
UNITED STATES PATENTS

| | | | |
|---|---|---|---|
| 1,151,397 | 8/1915 | Robinson | 16/144 |
| 1,218,531 | 3/1917 | Dilthey | 248/324 |
| 1,263,319 | 4/1918 | Heinzelman | 16/142 |
| 1,378,373 | 5/1921 | Earle | 16/142 |
| 1,535,085 | 4/1925 | Bamberger | 248/291 X |
| 1,552,223 | 9/1925 | Murray | 248/291 |
| 1,666,899 | 4/1928 | Henricson | 16/142 UX |
| 1,853,595 | 4/1932 | Asbury | 16/146 |
| 2,192,504 | 3/1940 | Placco | 16/142 X |
| 2,527,940 | 10/1950 | Krueger | 248/291 X |
| 3,186,574 | 6/1965 | Davidson | 16/150 X |
| 3,320,958 | 5/1967 | Nolan | 24/132 HL X |
| 3,896,527 | 7/1975 | Miller et al. | 16/DIG. 13 |

FOREIGN PATENTS OR APPLICATIONS

| | | | |
|---|---|---|---|
| 381,825 | 10/1932 | United Kingdom | |
| 567,542 | 3/1945 | United Kingdom | 16/141 |

*Primary Examiner*—Lawrence J. Staab

[57] ABSTRACT

An accessory instrument panel adapted to be mounted on an angular surface in a vehicle. The panel consists of a one piece molding having an upper mounting bracket that is fastened to the angular surface in the vehicle with arcuate flanges projecting downwardly from the bracket and having arcuate serrations on the outer surfaces thereof that interengage arcuate serrations on the sides of an instrument mounting panel. The mounting panel is pivotally mounted with respect to the mounting bracket so that the angular position of the mounting panel with respect to the mounting bracket and the mounting surface may be adjusted as desired.

4 Claims, 13 Drawing Figures

MOLDED PLASTIC ADJUSTABLE INSTRUMENT PANEL

BACKGROUND OF THE INVENTION

There have been provided in the past a plurality of instrument panel frames that can be mounted as accessory equipment on vehicles, such as on the original equipment instrument panel. In the past the vehicle surfaces upon which these accessory instrument panels have been mounted were generally either horizontal or vertical and hence a standard right angle bracket for the instrument panel would be adequate for such an application. However, with the advent of ungularly configured original equipment instrument panels, the problem has arisen that conventional right angular brackets no longer may be satisfactorily used, since such would result a disorientation of the accessory instrument when fastened to the original instrument panel. To satisfy this problem there have in been provided accessory instrument panels that are adjustable, but they require expensive hinge constructions as well as multiple part fastening elements to hold the accessory instrument panel in its proper angular orientation.

It is the primary object of the present invention to diminish the problems of the prior art.

SUMMARY OF THE PRESENT INVENTION

In accordance with the present invention an accessory instrument panel is provided that may be mounted on an angular mounting surface without the need for multiple parts, resulting in a panel construction that not only is less expensive to manufacture than existing panels, but also is more durable and rugged. This is accomplished through the provision of a one piece plastic molding including all parts of the instrument panel, as well as the mechanism for locking the front mounting panel in any angular orientation with respect to the mounting bracket. The mounting bracket is fastened to the angular surface to which the instrument is to be fixed.

In one embodiment of the present invention, the mounting bracket has integrally depending therefrom a pair of spaced resilient arcuate flanges that have serrations on the outer edges thereof that engage arcuate serrations on side surfaces on the mounting panel which in turn is hingedly or pivotally mounted to the mounting bracket. The mounting panel receives the accessory instrument itself.

After mounting the bracket on the mounting surface, the front mounting panel of the accessory instrument may be adjusted as desired by pivoting the same with respect to the mounting bracket.

In another embodiment of the present invention, instead of providing depending flanges from the mounting bracket for adjustably locking the mounting panel with respect thereto, depending posts are provided from the mounting bracket that have circular serrations thereon that interengage with apertures in the mounting panel to provide the necessary adjustability between the two parts.

A further feature of the present invention incident to the one piece molding of the entire instrument panel is that the hinge interconnecting the mounting bracket to the mounting panel is integral with both of these parts.

DETAILED DESCRIPTION OF THE PREFERRED EMBODIMENT

Figure 1:
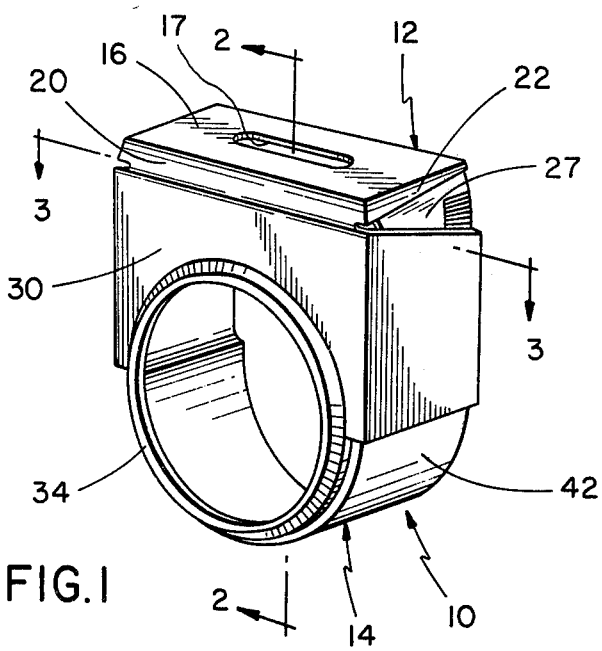
FIG. 1 is a perspective view of a first embodiment of the present invention illustrating the mounting bracket flange serrations in partial engagement with the serrations on the mounting panel.

Referring to the drawings, and particularly FIGS. 1-7, an instrument panel 10 is illustrated that is adapted to be mounted on an angular surface and thereafter adjusted to the desired angular orientation best suitable for the particular mounting surface of the vehicle in which it is employed.

An important feature of the present invention is that the entire instrument panel is constructed of a one piece plastic molding and requires no additional parts for positioning and angular orientation except the fastener necessary to mount the entire unit on the vehicle mounting surface.

As seen in the drawings, the instrument panel 10 generally includes a mounting bracket 12 and a mounting panel 14. The mounting bracket 12 is adapted to be fastened to an angular mounting surface and the mounting panel 14 receives a suitable instrument and the entire construction is designed so that the angular position of the mounting panel 14 may be adjusted with respect to the mounting bracket 12 and its associated mounting surface.

As seen in the drawings, the mounting bracket 12 includes a top member 16 having an elongated aperture 17 that receives suitable fasteners that attach the entire panel 10 to some angular surface of the vehicle. Depending from the top member 16 of the bracket 12 is a front wall 20 and side walls 21, 22.

Depending from the top wall member 16 are arcuate flanges 26 and 27. As shown clearly in FIG. 6, the dependng arcuate flanges 26 and 27 have significantly more than a 90 degrees orientation with respect to the top wall 16 in the as molded position of the instrument panel, but the flanges are somewhat resilient with respect to the top wall. As will appear hereinafter, this is for the purpose of assuring a tight engagement between serrations on the flanges and interengaging serrations on the mounting panel 14.

Figure 2:
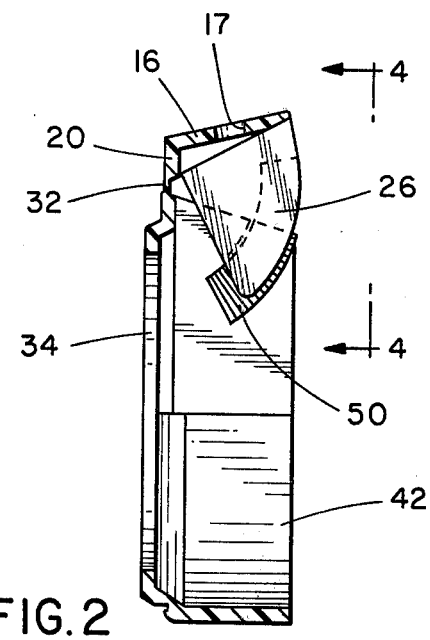
FIG. 2 is a cross-section taken generally along the line 2—2 of FIG. 1 illustrating one depending flange in engagement with the cooperating serrations on the inside of the mounting panel.
Figure 3:
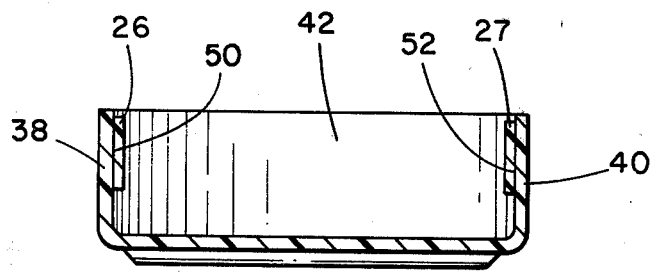
FIG. 3 is a cross-section taken generally along line 3—3 of FIG. 1, also illustrating both flanges in engagement with the mounting panel.
Figure 4:
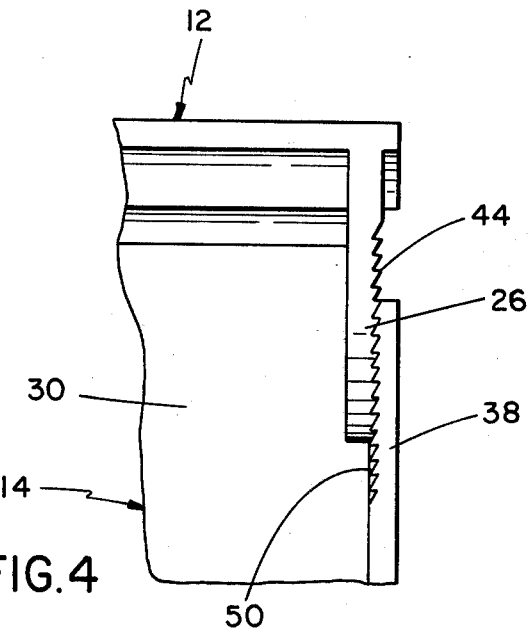
FIG. 4 is an enlarged fragmentary view taken generally along line 4—4 of FIG. 2 showing the serrations in interengagement.
Figure 5:
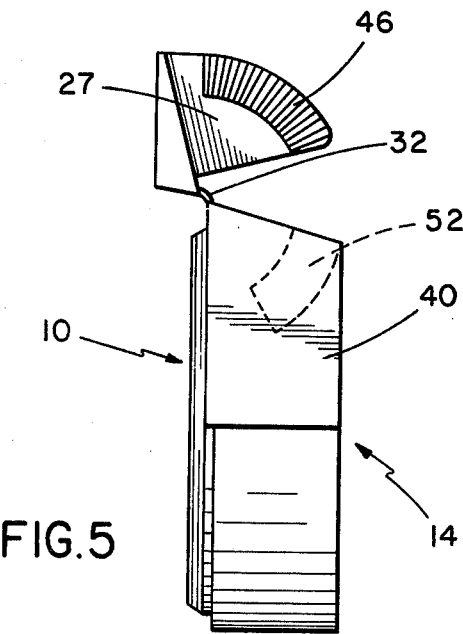
FIG. 5 is a side view of the instrument panel shown in FIG. 1 in its as molded position.

The mounting panel 14 consists of a front wall 30 hingedly mounted to the front wall 20 of the mounting bracket 12 by an integral narrow hinge element 32 shown clearly in FIGS. 2 and 5. Integrally formed with the front wall 30 is a hood element 34 for conventional purposes. Extending rearwardly from the front wall 30 are side walls 38 and 40 that are interconnected by an arcuate bottom wall 42. Again it should be understood that all walls of the instrument illustrated are integrally formed in a one piece plastic molding with the hinge 32 sufficiently thin so that the necessary flexibility between the mounting panel 44 and the mounting bracket 12 is achieved.

For the purpose of adjustably locking the two elements, i.e., the mounting panel 14 and the mounting bracket 12 in the desired angular orientation, arcuate segmental serrations 44 and 46 are integrally formed on the flanges 26 and 27. Cooperating with these serrations are integrally formed arcuate segmental serrations 50 and 52 on the upper inside surfaces of the side walls 38 and 40 of the mounting panel 14.

Figure 6:
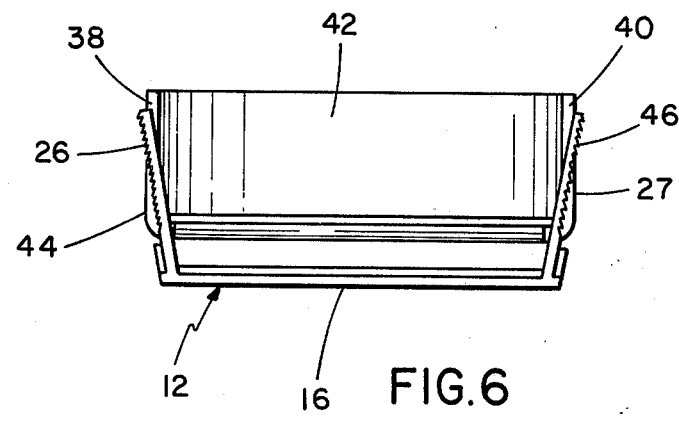
FIG. 6 is a top view of the instrument shown in FIG. 1 with the mounting bracket raised completely in its as molded position.
Figure 7:
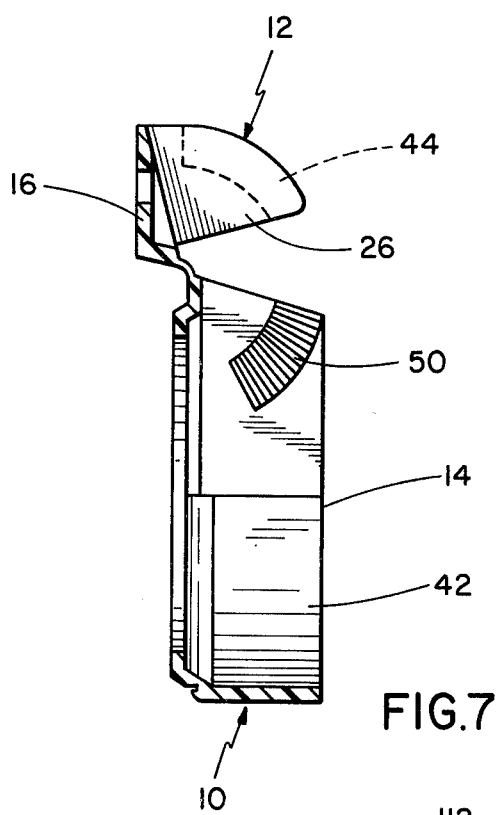
FIG. 7 is a cross-section of the instrument panel shown in FIG. 1 with the mounting panel raised completely in its as molded position.

The instrument panel 10 is illustrated in FIGS. 5, 6 and 7 in the as molded position in which the mounting bracket 12 is completely disengaged from the mounting panel (except for hinge 32), and the flexible flanged 26 and 27 are spread outwardly in their relaxed positions past the limits of the side walls 38 and 40 of the mounting panel 14.

After fastening the mounting bracket 12 to the mounting surface through aperture 17, the flanges 26 and 27 are flexed inwardly and the mounting bracket 14 rotated until the flanges 26 and 27 are inserted within the side walls 38 and 40 so that the serrations 44 and 46 interengage serrations 50 and 52 on the mounting panel side walls 38 and 40. Thereafter, the mounting panel 14 may be adjusted as desired with respect to the mounting bracket 12.

Figure 8:
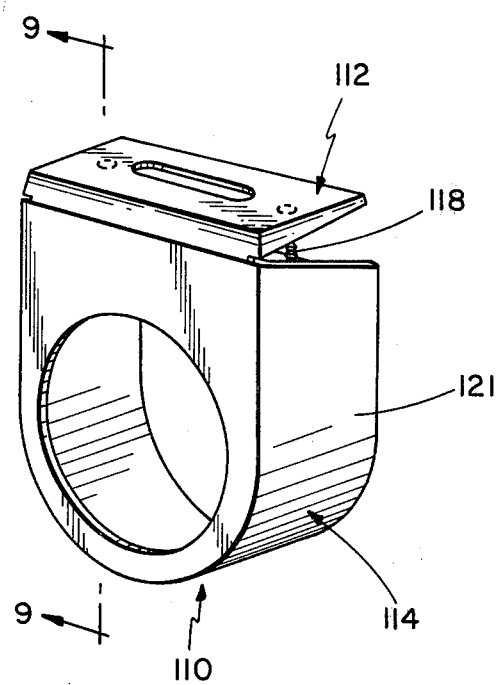
FIG. 8 is an alternative embodiment of the present instrument panel employing posts rather than flanges on the mounting bracket.
Figure 9:
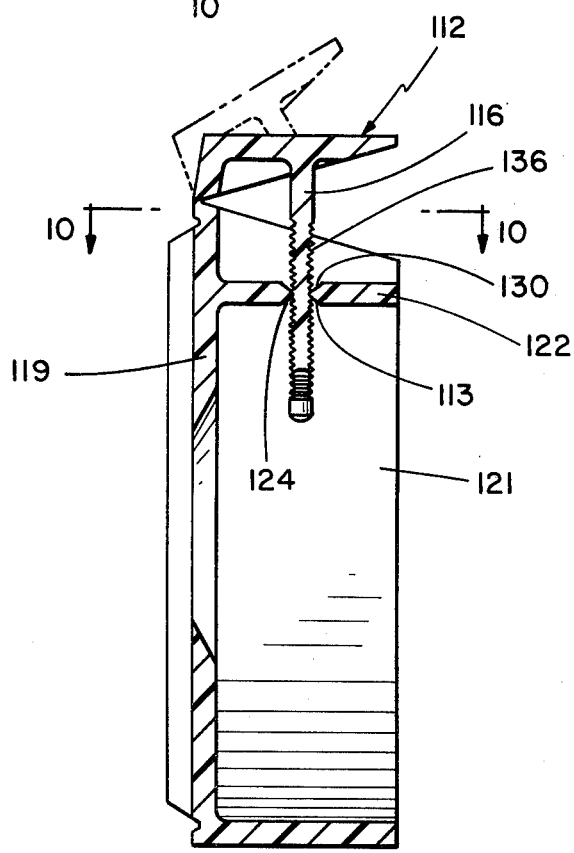
FIG. 9 is an enlarged cross-section taken generally along line 9—9 of FIG. 8 showing one of the adjustable posts in its clamped position.
Figure 10:
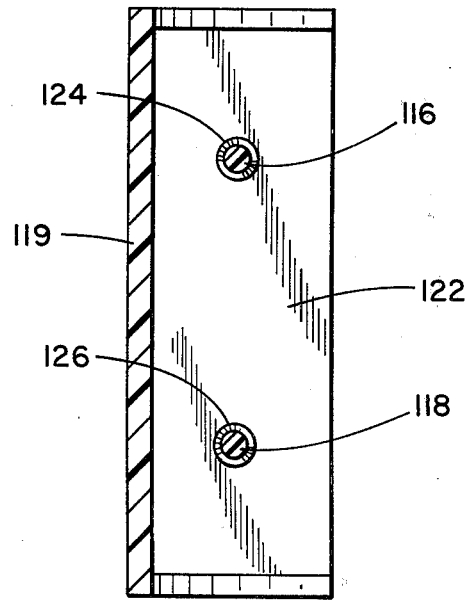
FIG. 10 is a cross-section taken generally along line 10—10 of FIG. 9 showing both of the fastening posts extending through apertures in the mounting panel.

As shown in FIGS. 8 to 10 an alternative form of the present invention is illustrated including an instrument panel 110 that is also a one piece integral plastic molding. Instrument panel 110 consists of a mounting bracket 112 and a mounting panel 114 pivotally adjustable with respect to the bracket 112. The mounting bracket 112 has depending therefrom two integrally formed somewhat flexible posts 116 and 118.

The mounting panel 114 has a front wall 119 and a U-shaped side wall 121. Extending between the side walls 121 is a cross supporting wall 122 that has apertures 124 and 126 therein. Each of these apertures is generally circular in configuration and has countersunk portions 130 and 132 defining pointed rings that interengage with serrations 136 on the posts 116 and 118 to adjustably lock the mounting panel 114 in the desired angular orientation with respect to the mounting panel 112.

The mounting and adjustment of the instrument panel 110 is similar to that described above with respect to the instrument panel 10.

Figure 11:
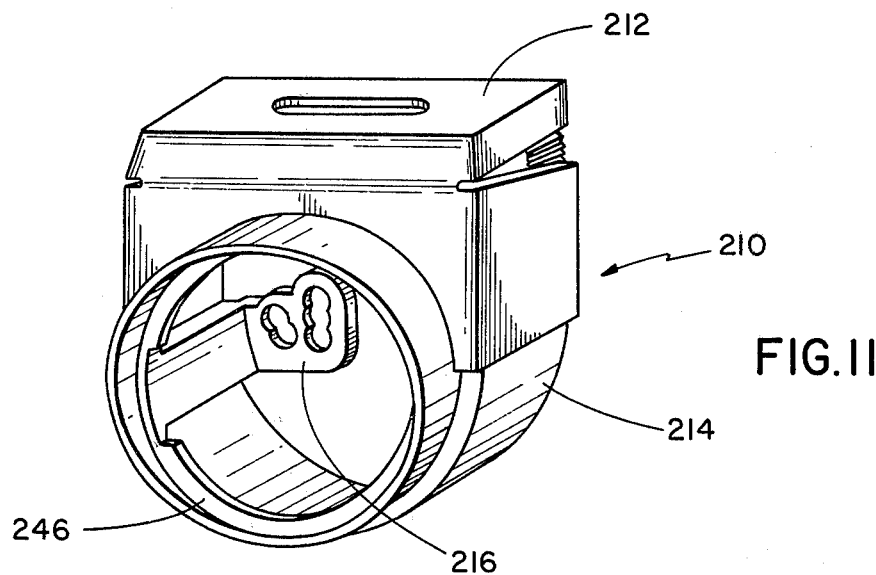
FIG. 11 is a perspective view of a still further embodiment of the present invention.
Figure 12:
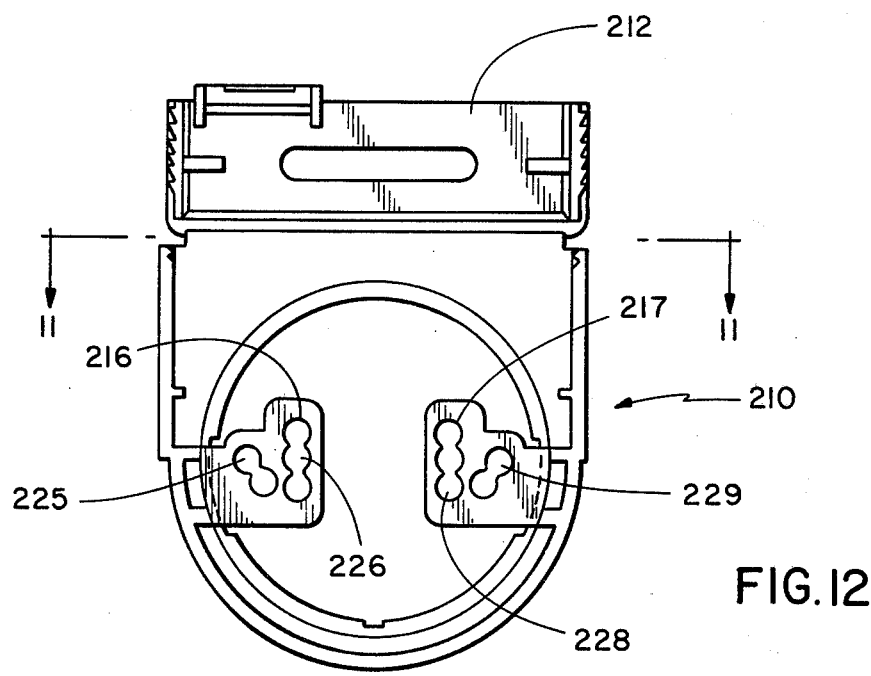
FIG. 12 is a rear view of the embodiment shown in FIG. 11 with the top bracket disengaged.
Figure 13:
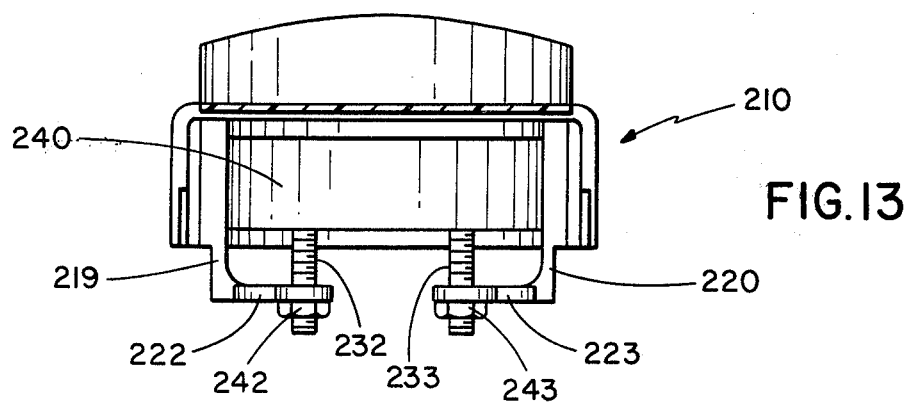
FIG. 13 is a cross-section taken generally along line 11—11 of FIG. 12 illustrating an instrument in position within the panel.

A still further embodiment of the present invention is illustrated in FIGS. 11–13 generally similar to the embodiment shown in FIGS. 1–6. Instrument panel 210 is illustrated including a mounting bracket 212 adapted to be connected to a mounting surface and a mounting panel 214 both generally similar to the mounting bracket 12 and mounting panel 14 illustrated in FIGS. 1–6.

The primary difference in the embodiment in FIGS. 11–13 is the provision of instrument brackets 216 and 217. These brackets project rearwardly with flanges 219 and 220 and have transversely extending portions 222 and 223. the transversely extending portions have apertures 225 and 226 in flange portion 222 and 228 and 229 in flange portion 223.

The apertures 225, 226, 228 and 229 are adapted to receive threaded fasteners 232 and 233 projecting rearwardly from instrument 240 illustrated clearly in FIG. 13.

The threaded fasteners 232 and 233 project through one portion of the apertures 225, 226, 228 and 229 depending upon the location of the threaded fasteners.

Thus it is apparent that the brackets 216 and 217 can accomodate instruments 240 having a variety of fastener positions. The nuts 242 and 243 draw the instrument into the mounting panel 214 until the forward flange of the instrument (not shown) engages flange 246 shown in FIG. 11. Thus, in the embodiment shown in FIGS. 11-13 all of the primary elements of the instrument panel are integrally molded and require no additional brackets or adjustable fasteners.

Moreover, referring to FIG. 12, a lighting bracket 238 is provided as part of the basic molding. Prior art lighting brackets are a separate piece of hardware whereas this construction eliminates the lighting bracket, nut, screw and washer as separate items.

A still further feature referring to FIG. 12 is the provision of slots 210A that permit the instrument panels to be linked side by side by means of a barbed metal clip (not shown) which engages in slots 210A. This provides for a multiple gauge panel.

What is claimed is:

1. An instrument panel, comprising; a mounting bracket adapted to be fixed to a surface of random orientation, a mounting panel pivotally connected to said mounting bracket, said mounting panel having an opening therethrough for receiving an instrument, integral hinge means interconnecting said mounting bracket and said mounting panel, means for locking said mounting panel at a predetermined angular orientation with respect to said mounting bracket including means on said mounting panel having at least one tooth integrally molded therewith, a projection integrally molded with said mounting bracket and having a plurality of serrations thereon, said projection including at least one post having said serrations thereon, and said mounting panel having a circular aperture thereon defining said one tooth and receiving said post.

2. An instrument panel, comprising; a mounting bracket member adapted to be mounted to a relatively fixed surface, a mounting panel member pivotally connected to said mounting bracket member, said mounting panel member having an opening therethrough adapted to receive an instrument, projection means on one of said members, receiving means on the other of said members, said member one projection means including two arcuate flanges having arcuate serrations on the exterior thereof, said flanges projecting from said one member and at least slightly overlapping said receiving means on said other member, said other member having sides, said other member receiving means including said sides and the inside of said sides having arcuate serrations engaging the arcuate serrations on said flanges and holding said flanges in a stressed position maintaining serration engagement.

3. An instrument panel, comprising; a mounting bracket member adapted to be mounted to a relatively fixed surface, a mounting panel member pivotally connected to said mounting bracket member, said mounting panel member having an opening therethrough adapted to receive an instrument, projection means on one of said members, receiving means on the other of said member, said one member projection means including two spaced posts having serrations thereon, and said receiving means on said other member including two spaced apertures having pointed cross-sections for receiving said posts in any desired position.

4. An instrument assembly; comprising a mounting bracket having a top member, two arcuate flanges at the opposite sides of the top member projecting downwardly, said arcuate flanges having arcuate serrations on the outer surfaces thereof, said flanges being integrally formed with said top member, said flanges being flexible and projecting outwardly at an angle of greater than 90° from said top member in their relaxed position, a mounting panel pivotally connected to said mounting bracket, integral hinge means interconnecting said mounting bracket and said mounting panel, said mounting panel and mounting bracket being a one piece plastic molding, said mounting panel having a front member with an opening therethrough for receiving an instrument, and side members projecting rearwardly from said front member, the outside upper surfaces of said side members having arcuate serrations thereon interengaging said serrations on said flanges and holding said flexible flanges at substantially 90° with respect to the bracket top member.

* * * * *